Sept. 12, 1961 F. MISCHE 2,999,416

PHOTOGRAPHIC MEASURING FINDER

Filed May 26, 1958

INVENTOR
FRIEDRICH MISCHE

By Blum, Moscovitz,
Friedman & Blum

Attorneys

United States Patent Office 2,999,416
Patented Sept. 12, 1961

2,999,416
PHOTOGRAPHIC MEASURING FINDER
Friedrich Mische, Braunschweig-Gliesmarode, Germany, assignor to Voigtlander A.G., Braunschweig, Germany, a corporation of Germany
Filed May 26, 1958, Ser. No. 737,615
Claims priority, application Germany Oct. 2, 1957
13 Claims. (Cl. 88—2.4)

This invention relates to measuring finders for photographic purposes and it has particular relation to view finders which are based on the Albada principle and combined with a range finder in the manner described hereinafter.

In view finders based on the Albada principle, an image field framing, which corresponds to the size of the photographic picture, is reflected into the image field of the finder. The eye, looking at the eyepiece of the finder, looks through an arched, partially permeable mirror at the object. Simultaneously, this mirror forms the image of a reflecting frame arranged at a suitable point within the finder, e.g. in the focal plane of the mirror at about infinity.

It is a primary object of the present invention to provide a measuring view finder which is formed by a finder comprising a preferably three-part glass block, in which the partially permeable mirror as well as the frame to be reflected are located in cemented surfaces between the individual parts of the block, in combination with a range finder.

It is also an object of this invention to design the range finder in such a manner that the base of the range finder extends, in a manner known by itself, completely within glass. Accordingly, there should be a prism-like or other suitable glass base, at the free end of which the surface for deflecting the range finder ray and the optical adjusting member, preferably an Abat wedge, are arranged.

In carrying out this invention, it is contemplated to use a combination of the following features: The connecting intermediate part of the beforementioned block-shaped Albaba finder is subdivided by an inclined surface which is partially permeable or in part fully metalized. Furthermore, at the same time a prism, or the like, which forms the base of the range finder, is fixedly mounted on the finder block.

This last mentioned prism-like base part may be, for example, cemented to the finder block, or connected thereto in other suitable manner. According to a modification of the present invention it forms a one-piece member with the intermediate part of the Albada finder.

An advantageous embodiment of this principle consists in that the intermediate or middle glass block of the Albada finder is subdivided and, between the resulting two parts of this glass block, a prism-like glass body, which carries the beam-splitting and uniting partially permeable mirror arranged in the optical axis of the finder, is inserted and fastened, e.g. by cementing. This glass body carries the base of the range finder and, therefore, projects from the finder body. As the carrier of the ray-deflecting, partially permeable mirror, this interposed, bar shaped part is made, for reasons of manufacture, of two parts, whereby the surface carrying the partially permeable mirror forms the separating surface to be cemented. The complete measuring finder consists, in this case, of six glass parts which can be easily manufactured and built precisely together for obtaining the desired optical effects.

The above described prism-shaped glass part of the range finder can be arranged at a right angle to the finder axis, whereby the partially permeable mirror is inclined at an angle of 45°. However it is also within the scope of this invention, to arrange the mirror with an inclination which differs from this diagonal direction and in this case the prismatic range finder body projects obliquely from the finder body. Such arrangement is of advantage in some cases, for example for reasons connected with the spatial ardrangement. The optical performance of the range finder is thereby not adversely affected.

The position of this range finder part can be adapted to wishes and requirements in the camera, i.e. the part can be located in the middle of the middle block of the finder, or arranged in the direction toward the partially permeable mirror or toward the frame to be reflected.

It is also possible to use the glass part of the range finder, which carries the base, as the lower part of the Albada finder. It is then necessary to insert in this part the carrying member for the frame to be reflected and, if desired, to arrange on it, or in it, the eyepiece lens.

Arranged at the free end of the beforementioned range finder prism is the optical adjusting device which preferably consists of the above mentioned Abat wedge. Its positive part is fixedly connected with the prism, while the negative part, facing the object, is pivotally mounted. In order to avoid undesired changes between the pivoted part and the other parts of the range finder, it is contemplated according to the present invention, to rotatably arrange the pivoted part directly on the prism. It is preferred to arrange the pivoted lens at a finite distance from the fixed lens of the Abat wedge, and to design it in such a manner that both lenses have equal focal lengths and their principal points coincide. At least one of the two lenses of this wedge is designed as a meniscus and both may be meniscus-shaped, if desired. It is of advantage to arrange the pivoted lens for adjustment both laterally of the mounting block or prism and axially of the Abat wedge. It is preferred to use point suspension. Thereby, the bearings are located either in the glass block proper, or jewels, of the type used in watches, are fastened to the glass block.

The appended drawings diagrammatically illustrate some specific embodiments of and best modes for carrying out the invention, to which the invention is not limited.

In the drawings.

Identical and similar parts of the illustrated devices are denoted by the same reference symbols in the drawings.

Figure 1:
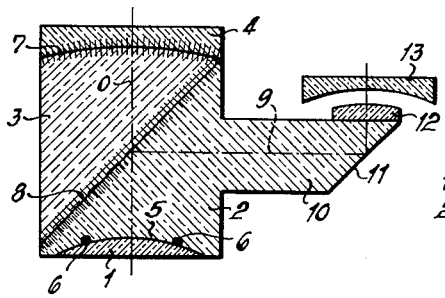
FIG. 1 is a somewhat diagrammatic horizontal sectional view through a measuring finder embodying the invention, and illustrating one form which the invention may take in practice.

Referring to the drawings in detail, in the embodiment of FIG. 1 the Albada view finder is illustrated as including an eyepiece or ocular 1, prisms 2 and 3 forming the intermediate block of the view finder, and a front member or objective lens 4. The finder axis is denoted 0. Parts 1 and 2 are cemented together at the curved surface 5. To this surface the frame 6 to be reflected is applied, preferably deposited by vaporization. This frame is located in about the focal plane of the partially permeable mirror 7 and its image is formed at about infinity. The connecting surface between parts 3 and 4 is curved and is in the present case a cemented surface. It is possible to arrange there also a narrow air lens, without fundamental effect on the object and effect of the present invention. A partially permeable mirror deposited by vaporization is indicated at 7. The prism-shaped parts 2 and 3 are brought together and cemented to each other along an inclined surface 8. In the embodiment shown in FIG. 1 a partially permeable mirror extends over the entire surface in this cemented surface. However, it is also possible to have a mirror only over a part of surface 8, this part being either partially permeable or fully metalized. The dimensions of this mirror depend—in a manner known by itself—on the desired dimensions of the range finder image. Prism 10, which carries base 9, is arranged on prism 2. In the embodiment illustrated in FIG. 1, this prism 10 is integral with prism 2 of the Albada finder. However, prism 10 may be also cemented, or otherwise fastened, to prism 2. On the inclined surface 11 of prism 10, the beam of rays coming from the object and passing through the Abat wedge 13, 12, is reflected and passes in the direction of optical axis 9, over mirror 8 and eyepiece 1, to the eye (not shown). Positive lens 12 is fixedly cemented to prism 10 and negative lens 13 is pivotally adjustable relative to lens 12 for adjustment to distance in a manner known by itself.

The above described construction can be easily manufactured with high precision. Furthermore, it has the advantage of compact structure and high stability with regard to the position of the optical parts relative to each other.

It may be of advantage to insert in the Albada finder, instead of the embodiment shown in FIG. 1, a separate range finder base prism. Such construction is diagrammatically illustrated in FIG. 2. It is assumed that prisms 2 and 3 shown in FIG. 1 form a single undivided block, in the embodiment of FIG. 2. This block is divided by a vertical section into the parts 200 and 300. Between these parts a bar-shaped glass member or prisms, which consists of parts 100 and 101, is inserted. Both parts are cemented together along an inclined interface 800, which carries a partially permeable mirror or a fully metalized surface. In other respects, the measuring finder shown in FIG. 2 corresponds in its construction to that shown in FIG. 1. It has an Abat wedge 12, 13, and prism 101 is provided with inclined surface 11.

Figure 2:
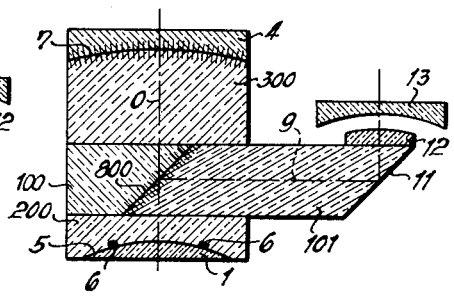
FIG. 2 is a view similar to FIG. 1 but illustrating the base of the range finder as inserted as a separate prism into the intermediate block of the view finder.
Figure 3:
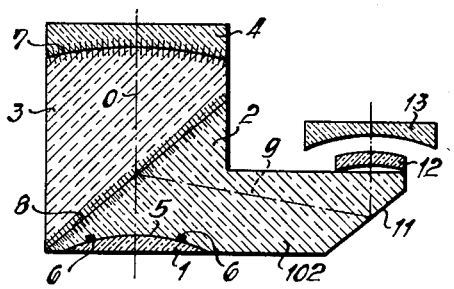
FIG. 3 is a view similar to FIG. 1 illustrating the base of the range finder as having an outer surface substantially flush with the outer surface of the ocular of the view finder.

In the measuring finder illustrated in FIG. 3, in comparison with the finders shown in FIGS. 1 and 2, respectively, prism 102, containing optical axis 9, has an inner surface substantially coplanar with the exposed plane surface of eyepiece 1, so that it is flush with the eyepiece surface of ocular 1. As shown in FIG. 3, partially permeable mirrored interface 8 is here inclined at a greater angle to axis 0 than in the construction according to FIG. 1 and optical axis 9 is correspondingly inclined at an obtuse angle to axis 0. Inclined surface 11 must be designed correspondingly. In this embodiment too, prism 102 and the lower part 2 of the middle block of the Albada finder are integral with each other.

Figure 4:
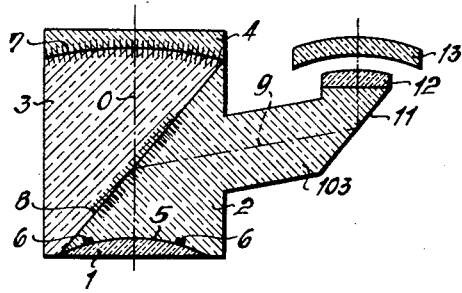
FIG. 4 is a view similar to FIG. 1 illustrating the measuring base of the range finder as extending at an acute angle to the optical axis of the view finder.

The measuring finder illustrated in FIG. 4 is fundamentally of the same effectiveness as the embodiments described above. In the embodiment of FIG. 4, prism part 103 projects obliquely toward the front side of the camera. As an example, in FIG. 4 only a part of cemented interface 8 is provided with a semi-permeable mirror coating. According to FIG. 5, likewise by way of example, full metalizing is shown on the middle part of interface 8, thus middle part intersecting the optical axis of the Albada finder.

Figure 5:
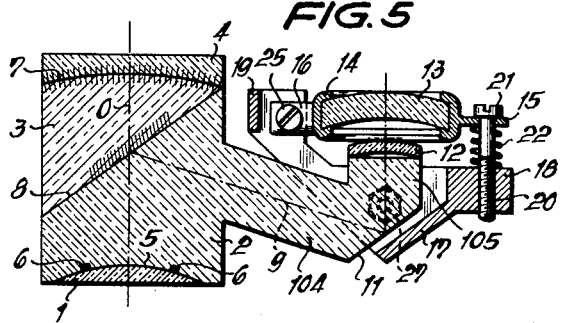
FIG. 5 is a view similar to FIG. 1 illustrating the base of the range finder as extending at an obtuse angle to the optical axis of the view finder and further illustrating the adjusting means for the pivotal member of the Abat wedge.
Figure 6:
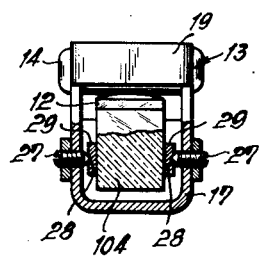
FIG. 6 is an end elevational view, partly in section, looking to the right at FIG. 5.
Figure 7:
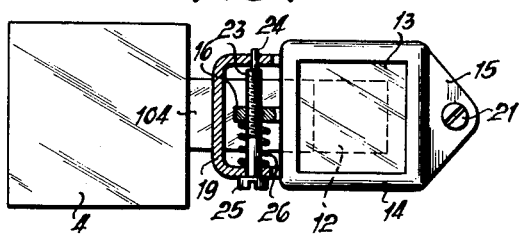
FIG. 7 is a side elevational view, partly in section, of the embodiment o fthe invention shown in FIG. 5.

FIGURES 5, 6 and 7 illustrate a measuring finder, in which the prism 2 of the Albada finder is connected with a prism 104 obliquely extending toward the eyepiece side. This embodiment shows also an advantageous modification of the Abat wedge. In this case too, positive lens 12 is fixedly cemented to prism 104, i.e. to its forwardly extending outer end 105. Pivoted negative lens 13 is arranged at a finite distance relative to positive lens 12. In order to secure an exactly defined position of lens 13 during adjustment thereof, mount 14 of lens 13 is connected with a carrying member 17, the shaft 27, 27 of which is arranged on prism 104 proper.

It has been further found to be of advantage to provide for adjustability of lens 13. In the example shown, two adjusting devices of this kind are shown. One of them serves for axial adjustment. In order to attain this, mount 14 has a flange-like part 15 connected with a collar-like part 18 of carrying member 17 by means of a screw 20 having a head 21. Screw 20 and can be screwed to a smaller or greater depth into collar 18. A compression spring 22 serves for securing exact maintenance of the adjusted distance. If by turning head 21, screw 20 is advanced, the negative lens 13 will be drawn nearer to the positive lens 12. Furthermore, vertical adjustment can be effected by the following arrangement which is shown particularly in FIG. 7. Lens mount 14 is provided with a flange-like part 16, which has an internally threaded bore. In the U-shaped part 19 of carrier member 17 a screw 23 is seated, which remains stationary when turned. Screw 23 has a peg 24, which is inserted in part 19 and freely rotatable therein. The head 25 of screw 23 rests on part 19. Spring 26 arranged between nut member 16 of mount 14 and the lower edge (in the drawing) of part 19, maintains the adjusted distance. If head 25 is turned by means of a suitable tool, member 16 will be displaced in vertical direction, whereby vertical adjustment of lens 13 results.

The means for holding member 17 comprise bolts 27, which have points 28 engaging jewels 29. These jewels, which may be of the type used in watches, are fixedly arranged on prism 104. They can be also omitted, whereby suitable notches have to be provided in prism 104 for direct engagement by points 28 of bolts 27.

It will be understood from the above that this invention is not limited to the specific constructions, designs, arrangements, and other details specifically described above and illustrated in the drawings and can be carried out with various modifications without departing from the scope of the invention as defined in the appended claims.

The term "Abat wedge" is a device which is well known in the art and described for example in page 143 of A. Konig: "Die Fernrohre und Erfernungsmesser," Verlag Springer Berlin 1937.

What is claimed is:

1. A measuring finder for photographic cameras comprising, in combination, an Albada view finder of the solid block type including a front member facing the object, an ocular member, an intermediate block extending between and in surface to surface contact with said members, a semi-permeable concave mirror disposed at the interface between said front member and said block and facing said ocular member, and a picture defining frame disposed at the interface between said ocular member and said block in substantially the focal plane of said mirror for reflection thereby at substantially infinity, said block being formed of plural components united in surface to surface relation and defining a mirrored interface intersecting the optical axis of the view finder at an acute angle thereto and facing said ocular member; and a range finder including a relatively elongated prism extending laterally from said intermediate block and containing the optical axis of the range finder, the outer end of said prism being beveled to reflect, along the range finder axis to said prism and to said mirrored surface for reflection by the latter to said ocular member along the optical axis of the view finder, light entering through a surface portion of said prism facing the object, and an Abat wedge including a positive member, mounted on said surface portion in the path of light rays from the object, and an adjustable negative member operatively associated with said positive member; said prism being an integral extension of one of said block components, whereby the paths of light rays entering through either said front member or said surface portion and directed to said ocular member, lie entirely within solid elements without intervening air spaces.

2. A measuring finder as claimed in claim 1, in which the mirrored interface in the intermediate block carries a partially permeable mirror layer.

3. A measuring finder as claimed in claim 1, in which the mirrored interface in the intermediate block carries a fully metallized mirror layer.

4. A measuring finder as claimed in claim 1, comprising an intermediate block subdivided into two components; said prism including a prismatic block inserted, transversely to the finder axis, between said two components; a part of said prismatic block, which projects from the view finder, forming the base of the range finder; said prismatic block being subdivided in the range of the finder axis to form said mirrored interface.

5. A measuring finder as claimed in claim 4, in which the mirrored interface of the prismatic block carries a partially permeable mirror.

6. A measuring finder as claimed in claim 4, in which the mirrored interface of the prismatic block carries a fully metallized mirror coating.

7. A measuring finder as claimed in claim 1, in which the ocular lens of the finder has an outer plane surface, and this plane surface and the rear surface of the prism including the optical axis of the range finder are located in the same plane.

8. A measuring finder as claimed in claim 1, in which the adjustable negative member of the Abat wedge has a pivotal bearing on said prism.

9. A measuring finder as claimed in claim 8, in which the stationary positive member of the Abat wedge is fastened to said prism; the pivoted negative member of the Abat wedge is arranged at a finite distance from said stationary positive member; said stationary member and pivoted member having equal focal lengths and coinciding principal points.

10. A measuring finder as claimed in claim 8, comprising means for adjusting the position of the pivoted negative member laterally of said prism.

11. A measuring finder as claimed in claim 8, comprising means for adjusting the position of the pivoted negative member axially of the Abat wedge.

12. A measuring finder as claimed in claim 8, in which the bearing points for the pivoted negative member are designed as point supports.

13. A measuring finder as claimed in claim 8, in which jewels are used at the bearing points.

References Cited in the file of this patent

UNITED STATES PATENTS

| | | |
|---|---|---|
| 1,678,493 | Albada | July 24, 1928 |

FOREIGN PATENTS

| | | |
|---|---|---|
| 558,417 | Germany | Sept. 7, 1932 |
| 454,064 | Great Britain | Sept. 23, 1936 |
| 846,959 | France | June 19, 1939 |
| 519,583 | Great Britain | Apr. 1, 1940 |
| 521,491 | Great Britain | May 23, 1940 |
| 746,756 | Germany | Aug 23, 1944 |
| 996,990 | France | Sept. 5, 1951 |